United States Patent [19]

Lange et al.

[11] 4,298,935

[45] Nov. 3, 1981

[54] INTERFACE CIRCUIT FOR COUPLING AN AUTOMATED MAINTENANCE SYSTEM TO A CPU

[75] Inventors: Ronald E. Lange, Phoenix; Robert J. Koegel, Glendale, both of Ariz.

[73] Assignee: Honeywell Information Systems Inc., Phoenix, Ariz.

[21] Appl. No.: 82,435

[22] Filed: Oct. 5, 1979

[51] Int. Cl.³ .......................... G06F 7/00; G06F 11/14
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,585,599 | 7/1971 | Hitt et al. ............................. | 364/200 |
| 3,623,011 | 11/1971 | Baynard, Jr. et al. ............... | 364/200 |
| 3,825,901 | 7/1974 | Golnek, Sr. et al. ................ | 364/200 |
| 4,030,072 | 6/1977 | Bjornsson ............................ | 364/200 |

*Primary Examiner*—Harvey E. Springborn

*Attorney, Agent, or Firm*—William W. Holloway, Jr.; Ronald T. Reiling; Nicholas Prasinos

[57] ABSTRACT

Apparatus for use in coupling an automated maintenance system of general utility to a central processing unit of a data processing system. The interface apparatus is comprised of path control and operational condition control registers to control and enable the paths accessed by the automated maintenance system and to control the conditions of operation of the central processing unit. A control point register stores control point information from the central processing unit indicating its internal status. This information is read and displayed by the automated maintenance system. Address and data registers serve to buffer data and addresses exchanged between the automated maintenance system and the CPU. The disclosed interface apparatus allows a general utility automated maintenance system to be adapted to test a specific central processing unit.

2 Claims, 15 Drawing Figures

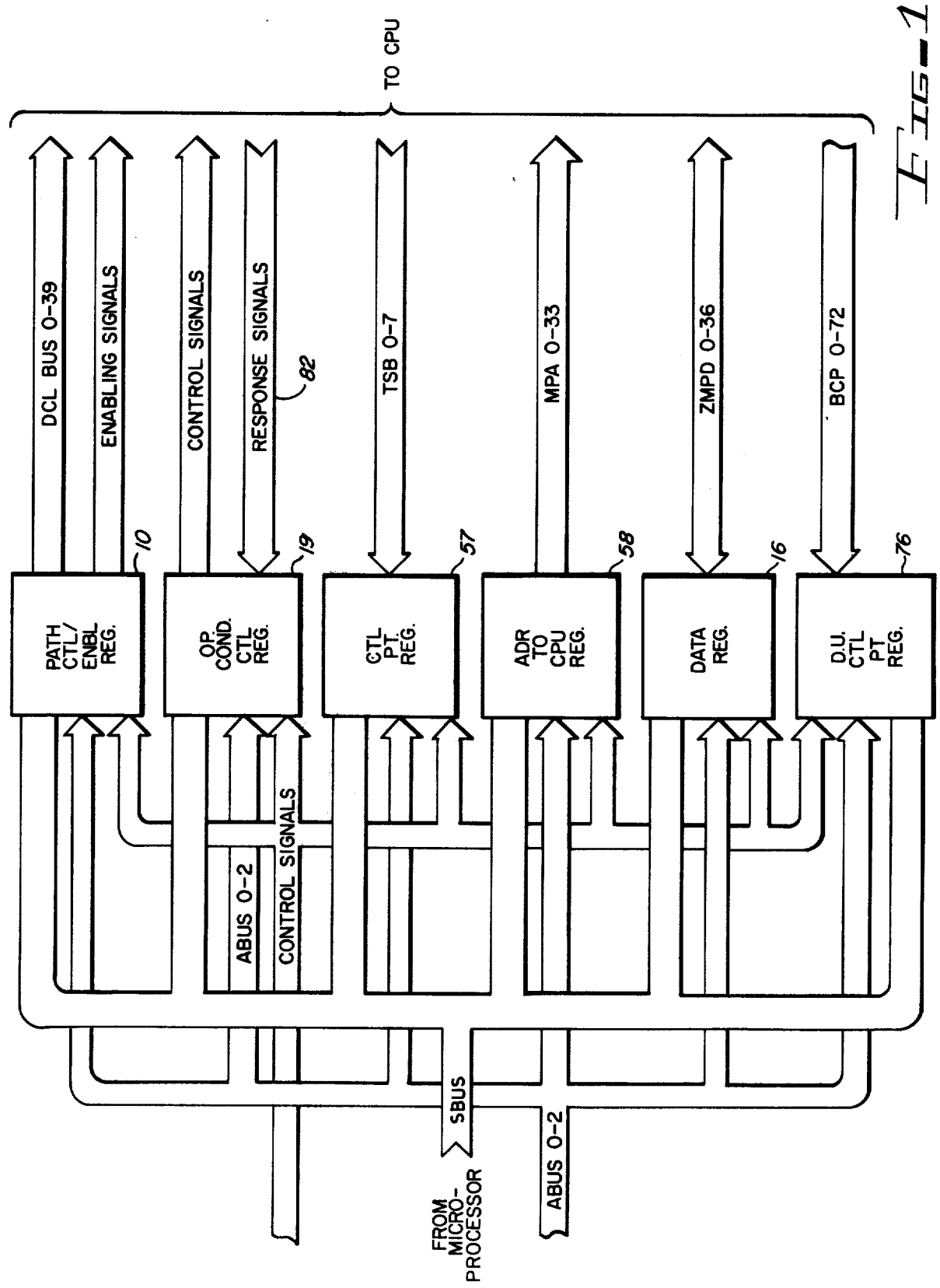

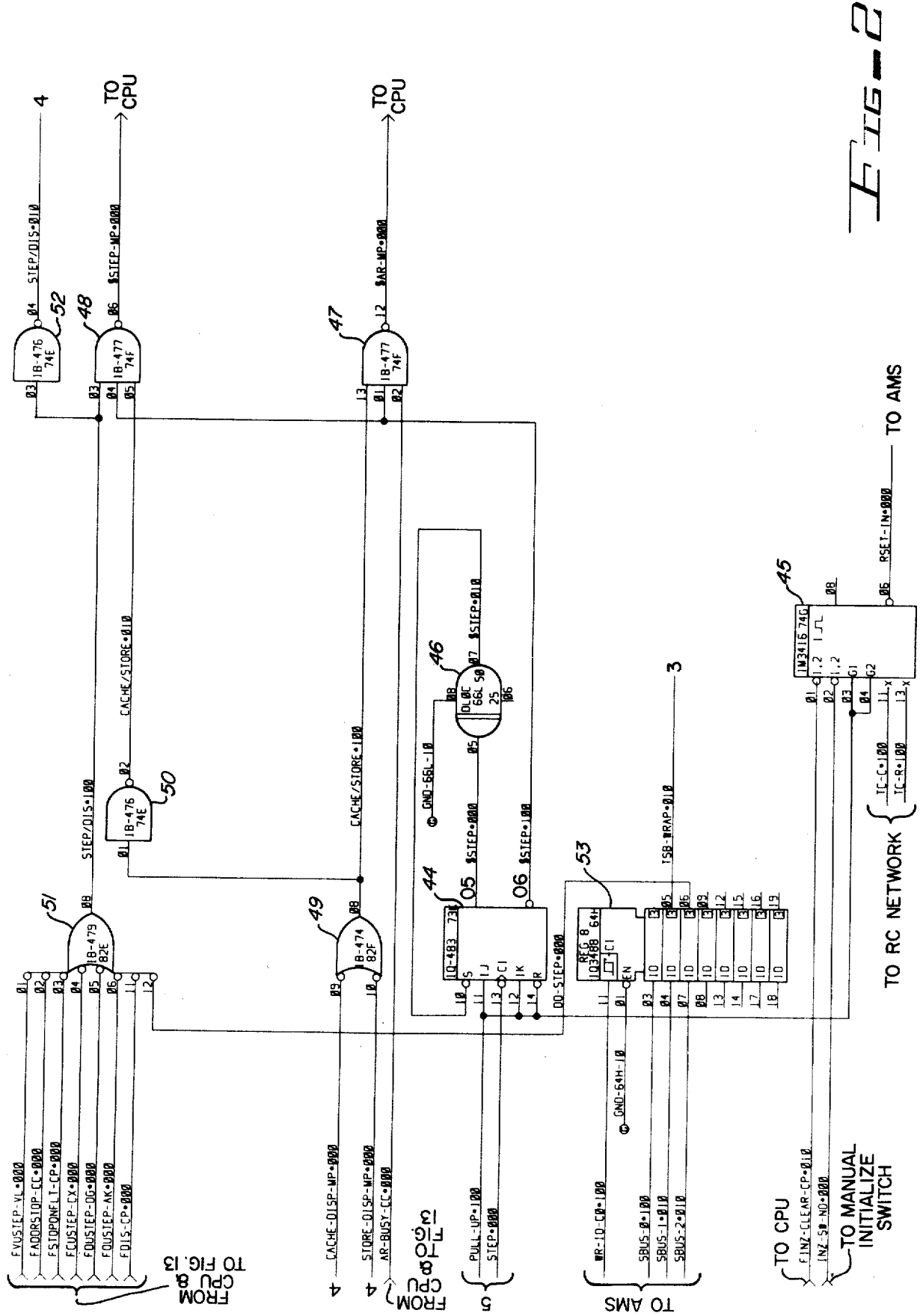

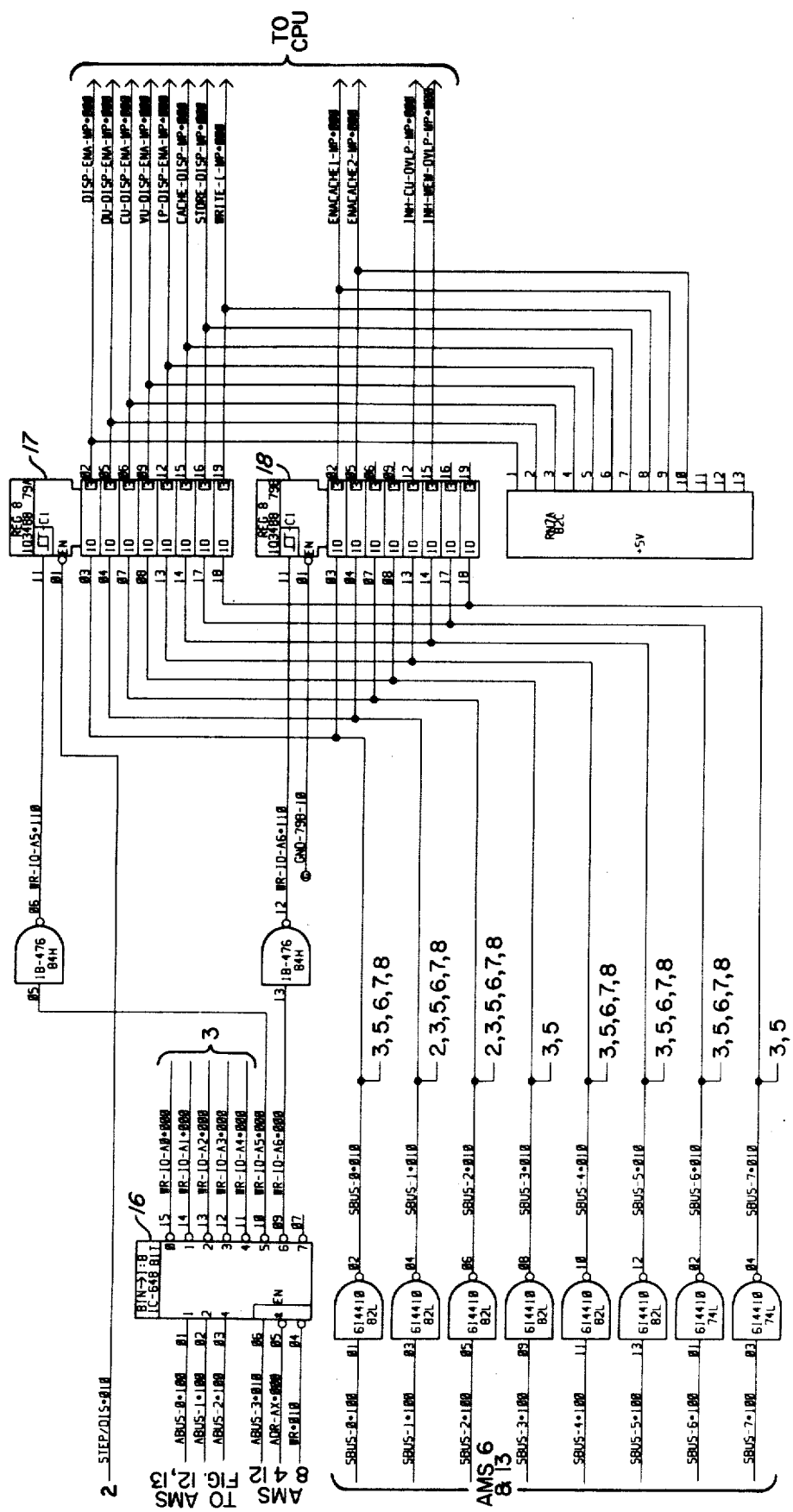

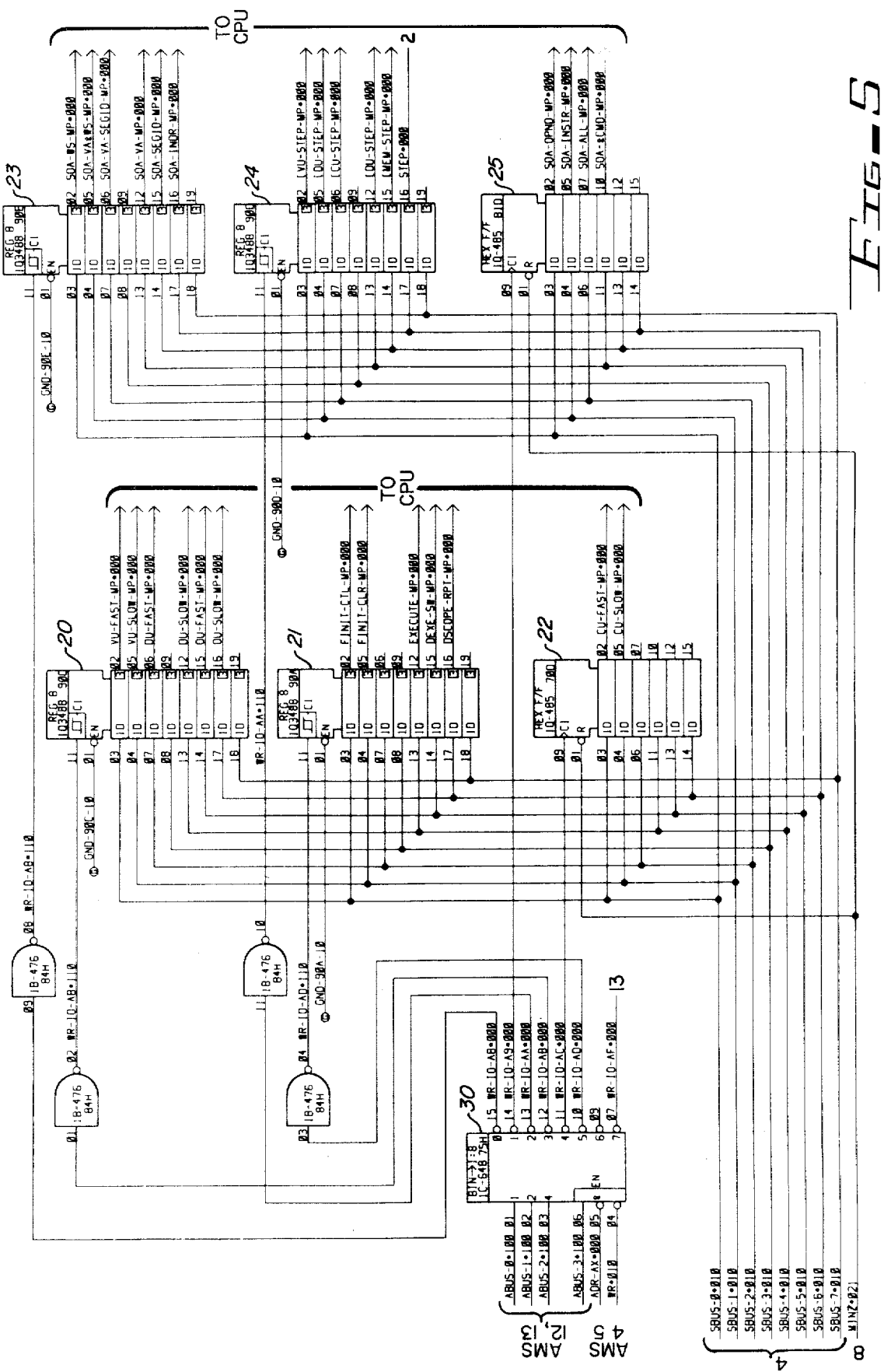

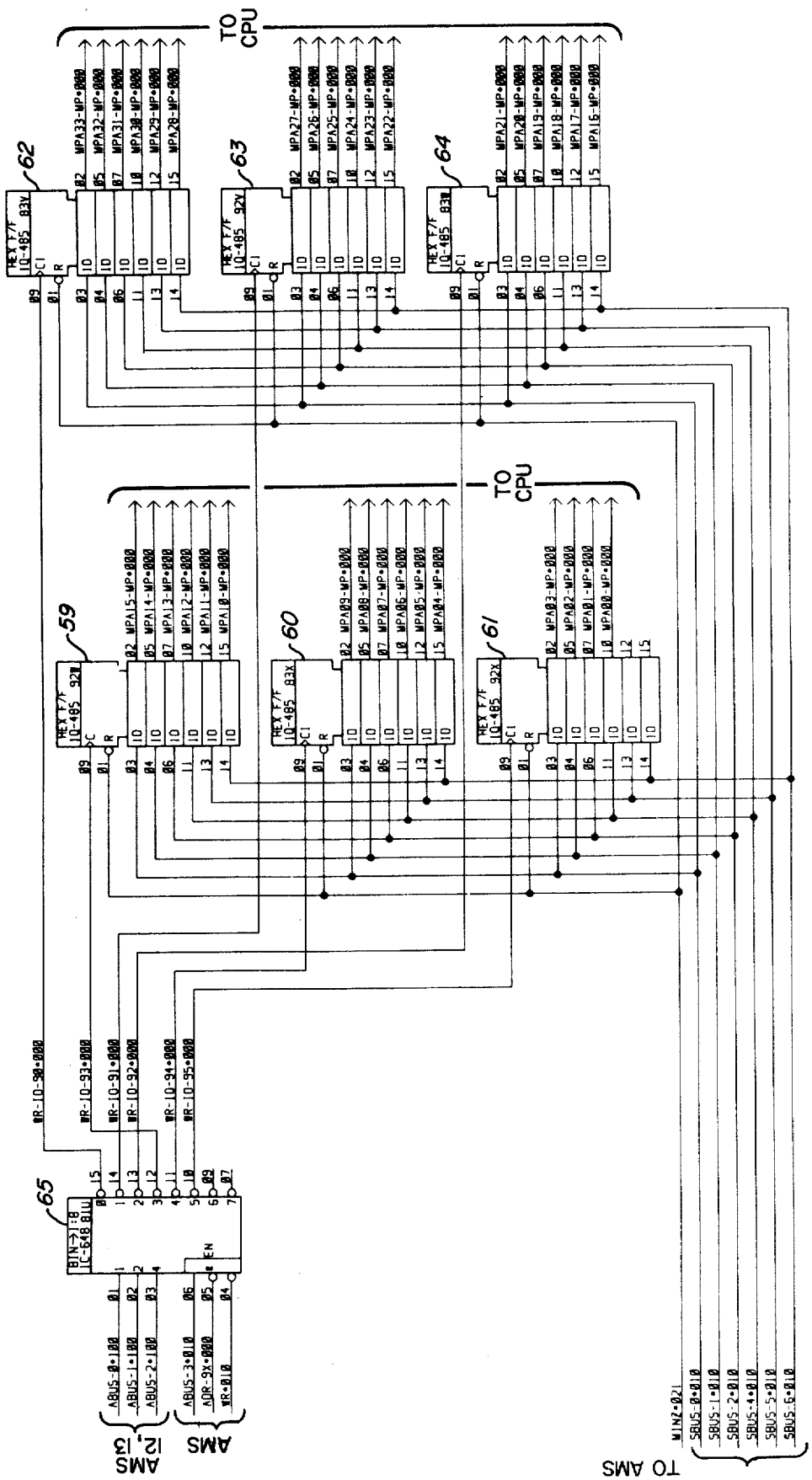

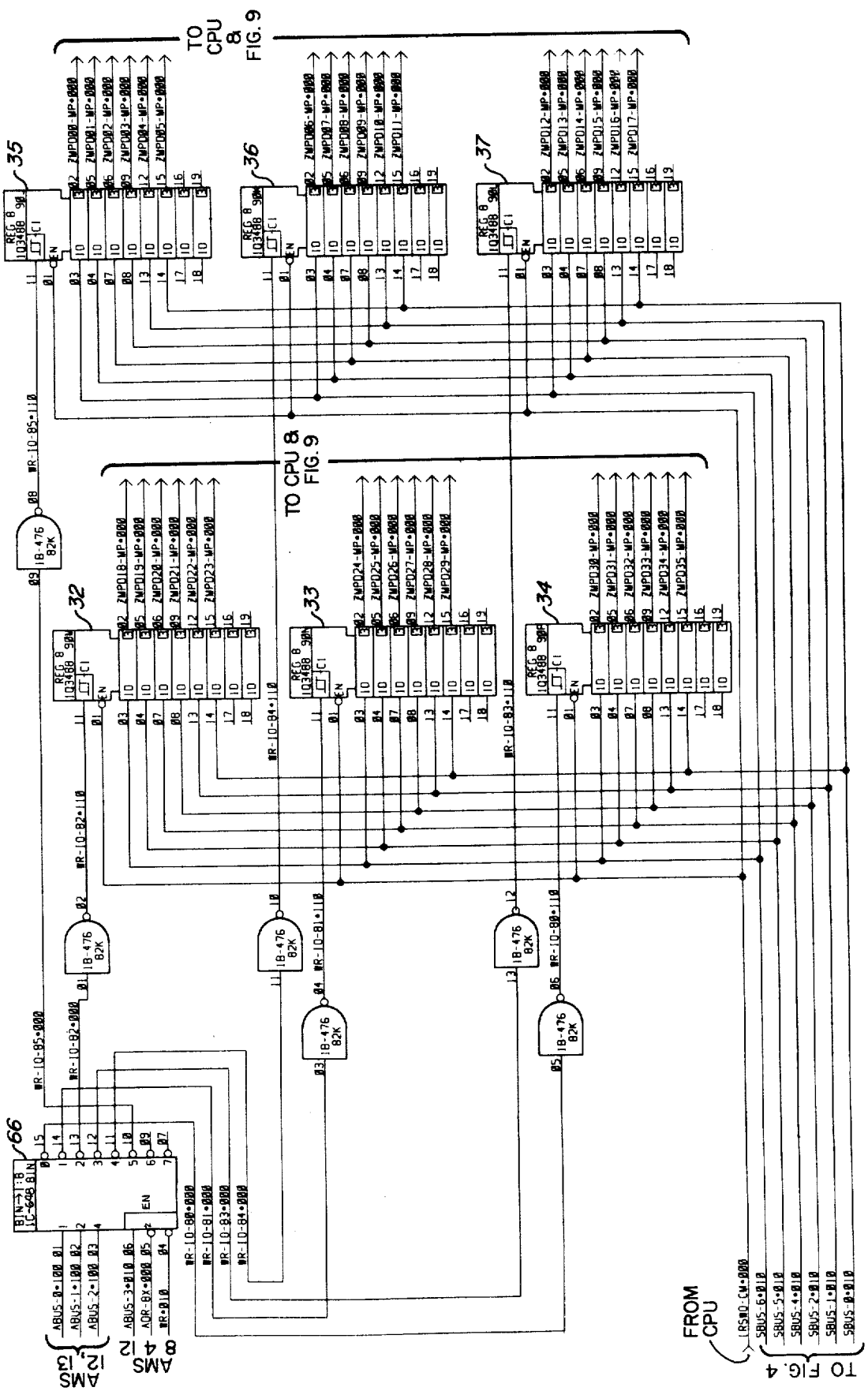

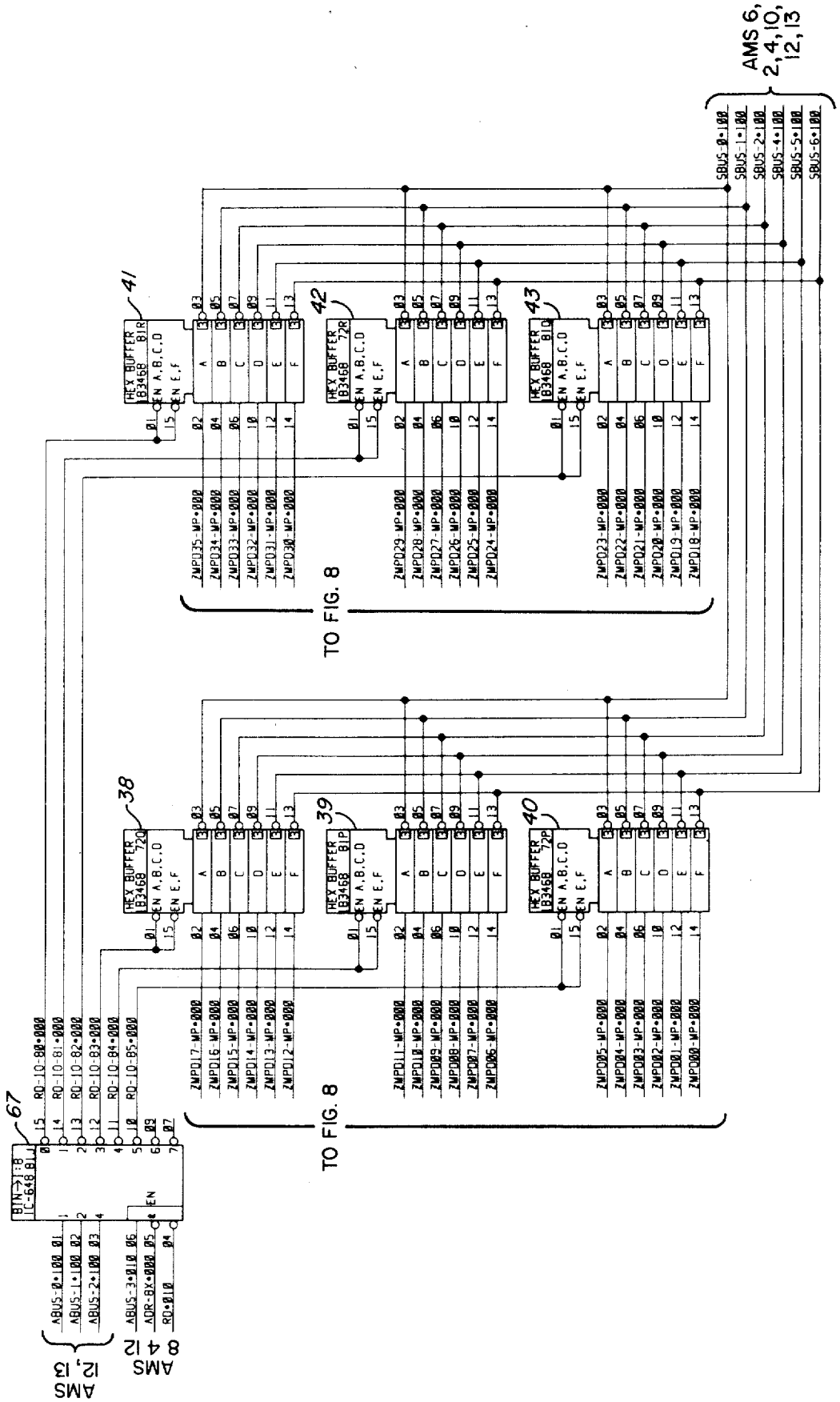

INTERFACE CIRCUIT FOR COUPLING AN AUTOMATED MAINTENANCE SYSTEM TO A CPU

BACKGROUND OF THE INVENTION

The subject matter of the invention disclosed herein is related to the subject matter of co-pending patent applications entitled: "Microprocessor Based Maintenance System", Ser. No. 75,773, filed on Sept. 17, 1979; and "Maintenance Panel for Communicating with an Automated Maintenance System", Ser. No. 75,771 filed on Sept. 17, 1979.

Most of today's large computer systems need provisions for rapid, low cost trouble shooting of hardware failures in the system. Some have complex arrangements of switches and display apparatus connected with the logic of the unit itself for entering data, addresses and commands and for displaying internal conditions in the machine. Typically these maintenance panel arrangements allow a field engineer to read data from and write data to registers and memory locations, to supply addresses, set fault conditions, set flags, control display functions, check the condition of various control points, check the status of the system and, in general, trace functioning of the system through each step of each machine instruction. Prior art maintenance panels, in addition to these cumbersome strings of switches and LEDs, often had separate command switches for selecting timing margins, selecting the registers or control points to be displayed and for causing the processor to execute commands set in the data switches. Entering data, commands and addresses via these complex arrangement of switches, and displaying data relating to the performance of the machine via long strings of LED indicators was time consuming and awkward.

Servicing computer systems is now the fastest growing segment of the computer industry according to a recent article in Business Week. A major reason is the spread of distributed processing which is resulting in computer hardware located everywhere. With computer terminals spread throughout a company, very often the data processing system is the central nervous system of the organization. Computer users are now very often less concerned with price performance ratios than with service turnaround time.

The automated maintenance system related to this invention is designed to replace prior art maintenance panels with microprocessor technology to streamline field engineering and reduce the manufacturing cost of data processing units in which the testing apparatus is incorporated. The system disclosed is incorporated into the structure of the central processing unit or other unit in the data processing system, and has an external interface for control of the testing apparatus from the external world. The preferred embodiment can be controlled from either a portable maintenance panel held in the hand of a field engineer or from a computer terminal located in the vicinity of the tested unit or from a computer terminal located anywhere in the world but coupled to the testing apparatus via a communications network. The possibility exists for interface of the testing apparatus to another digital computer programmed to run a predetermined series of tests on the tested unit from a centrally located field engineering office. That allows for rapid and accurate pinpointing of defects in the tested unit. The Automated Maintenance System enables the mainframe computer manufacturer to maintain a staff of highly trained maintenance specialists in a central location close to the manufacturing plant and gives them the capability of servicing computer systems all over the world. This enhanced maintenance capability not only decreases field engineering costs thereby enabling lower hardware costs to the customers, but also provides better maintenance support and shorter maintenance turnaround times for those customers.

Since it would be inefficient to design an individual microprocessor based maintenance system for each unit in a data processing system such as the CPU, the system controller and the I/O controllers, a general utility automated maintenance system was designed. This system is disclosed in the related patent applications referenced above. In order to adapt the general purpose automated maintenance system to the specific requirements of a Honeywell TM CPU, the system disclosed herein was devised.

SUMMARY OF THE INVENTION

In brief, the disclosed system is an interface circuit to couple a general purpose microprocessor based automated maintenance system having a single 8-bit output data port to the buses and control paths of a specific central processing unit. It is an object of this invention to streamline maintenance procedures by elimination of the necessity for use of old fashioned maintenance panels.

In broad perspective, the invention consists of path control and enabling circuitry which converts signals from the automated maintenance system into control signals which control and enable the pathways in the particular CPU which are accessed by the automated maintenance system.

Operation condition and control circuitry converts information from an automated maintenance system into control signals to the CPU which control the operation performed by it and the conditions of performance. This circuitry also receives response signals from the CPU which verify the operational conditions set by the automated maintenance system.

A control point register serves to receive control point information from the CPU indicating the internal status of various control flags known as control points. This circuitry also transfers this information to an automated maintenance system upon request.

Address buffer circuitry serves to supply the CPU with address information from the automated maintenance system. The supplied address information is used by the CPU in controlling whatever operation has been requested by an automated maintenance system. Such operations include reading the contents of cache locations, reading or writing to main store memory locations, and setting stop-on address conditions.

A data buffer assemblies supplied by an automated maintenance system data and transfers it to the CPU for use in controlling various operations or writing new data to internal registers or memory locations. This buffer also receives data from the CPU that is to be displayed by the automated maintenance system for analysis by a test operator and holds the data for transfer to the automated maintenance system in smaller bytes.

Finally, there is a byte size bus coupling the automated maintenance system to all the above described circuits. This bus supplies the data needed by those circuits to perform their operations and collects data received by these circuits from the CPU for transfer to and display by an automated maintenance system.

BRIEF DESCRIPTION OF THE DRAWINGS

The features and advantages of the disclosed invention may be better understood from the following description of the preferred embodiment read with the attached drawings, of which:

FIG. 1 is a block diagram of the overall organization of the interface circuit;

FIGS. 2, 5 and 7 are a logic diagram of the operating conditions control register 19 in FIG. 1;

FIGS. 3A, 3B and 4 are a logic diagram of the path control and enabling circuitry 10 in FIG. 1;

FIG. 6 is a logic diagram of the address to CPU register 58 in FIG. 1;

FIGS. 8 and 9 are a logic diagram of data register 16 in FIG. 1.

DETAILED DESCRIPTION OF THE PREFERRED EMBODIMENT

During the course of testing by the automated maintenance system, the contents of certain internal registers or memory locations of the CPU might need examination. Before the contents of those registers can be transferred to data register 16 via ZMPD bus, the proper pathway to the desired memory location or internal register must be selected and enabled. The selection of the pathway is accomplished by writing a particular bit pattern on DCL bus, lines 0–39.

Figure 3A:
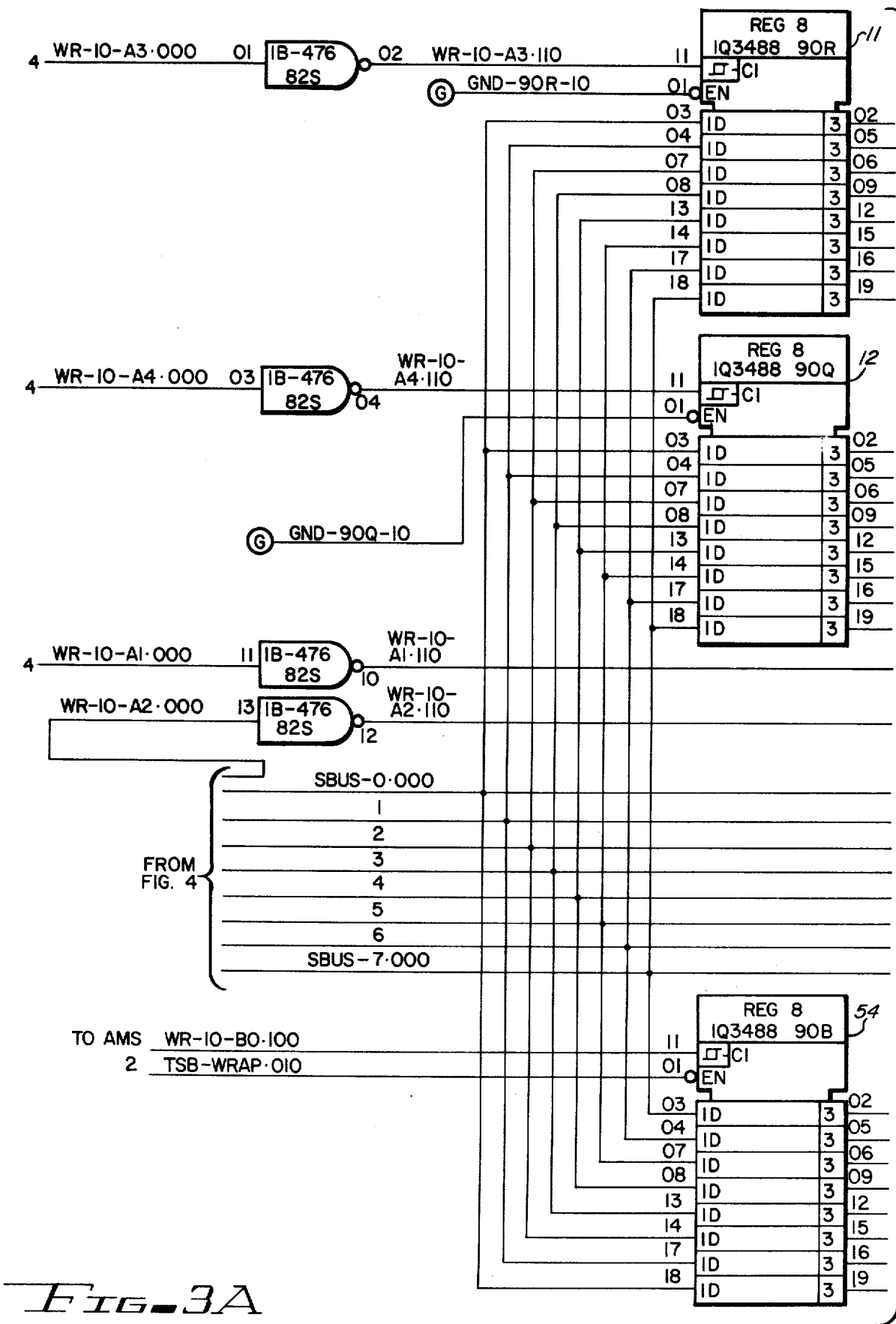
Figure 3B:
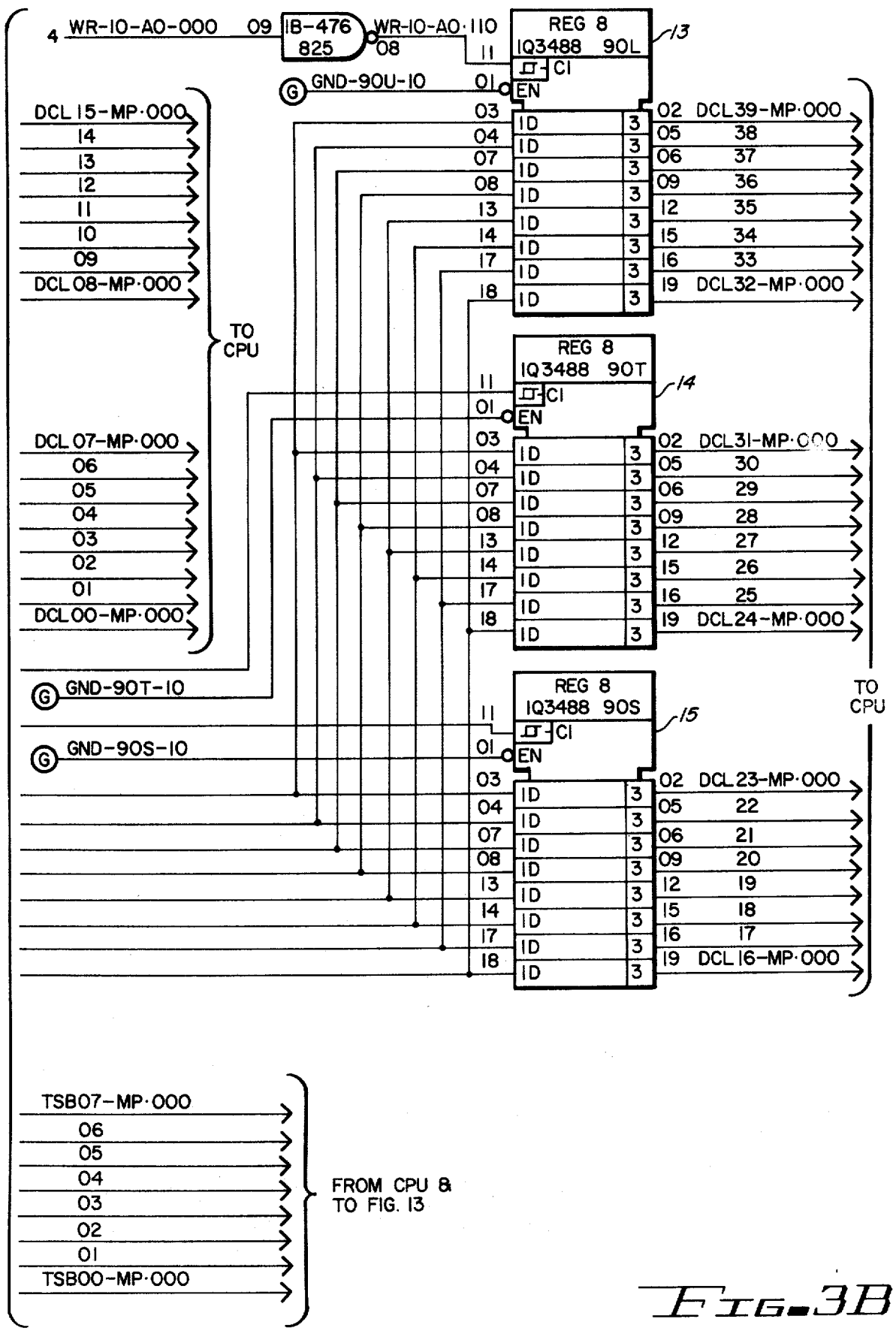

The path control and enabling function is performed by register 10 in FIG. 1. This circuitry is shown in more detail in FIGS. 3A and 3B. Eight bit bus drivers 11 through 15 serve to collect and reformat information presented to the interface circuit by the automated maintenance system via SBUS, lines 0–7. These bus drivers can be 74LS373 Octal D Latches. The characteristics of these elements are described in the TTL Data Book of Design Engineers, Second Edition, Texas Instruments, Inc. (1976), Dallas, Tex. The outputs from these bus drivers, lines DCL 0–39, constitute the display control bus for the CPU. This DCL bus carries information to the CPU regarding the state of each of the eight latch registers of bus drivers 11–15. Each latch serves as a toggle switch which can be controlled by the microprocessor in the automated maintenance system via SBUS lines 0–7. The pattern of logical 1's and 0's on the DCL bus serve to operate switches in the CPU which control the pathways therein which can be accessed by the data register circuitry 16 in FIG. 1.

The automated maintenance system writes the desired bit pattern into bus drivers 11–15 by presenting the pattern eight bits at a time on lines 0–7 of the SBUS. Each individual byte presented on the S bus is written into one of bus drivers 11–15 by selectively enabling only that bus driver. When pin 1 of bus drivers 11–15 is held low, the outputs will either follow the inputs or latch depending upon the state of pin 11. The outputs will follow the inputs when pin 11 is high and latch when pin 11 is taken low. It is seen in FIG. 3 that pin 11 of bus driver 11 is controlled by the signal WR-IO-A3.110 which comes from decoder 16 in FIG. 4.

Decoder 16 serves to couple the interface circuit to lines 0–3 of the automated maintenance system ABUS. The relationship of the ABUS to the elements of the automated maintenance system is further described in the copending patent application referenced earlier. The ABUS is part of the address bus controlled by the microprocessor in the AMS, and the connection of decoder 16 to the microprocessor of the automated maintenance system may be discerned by tracing lines 0–2 of the ABUS to FIGS. 12 and 13 of the above referenced patent application entitled "Microprocessor Based Maintenance System". Decoder 16 can be a 74LS138.

Similarly, the enable inputs of decoder 16 are coupled to line 3 of the ABUS and the signals ADR-AX and WR 010 on the control bus of the automated maintenance system. The origin of these signals may be found by referring to FIGS. 4, 8 and 12 respectively of the above referenced patent application.

Fundamentally, decoder 16 enables the microprocessor of the automated maintenance system to selectively enable each individual bus driver 11–15 in FIG. 2 as the bits required for that particular portion of the DCL bus bit pattern appears on lines 0–7 of the SBUS. For example, when bus driver 11 is to be enabled, the microprocessor will write the address A3 (hex) on the address bus and activate its WR output at pin 31 in FIG. 5 of the patent application for the automated maintenance system referenced above. This output signal can be traced to FIG, 8 therein where it is transformed to the signal WR 010 by latch 34. This signal can be traced to FIG. 4 of the present patent application and will take pin 4 of decoder 16 low. Likewise, the signal ADR-AX can be traced to FIG. 4 of the patent application for the automated maintenance system (hereinafter referred to as the AMS application). It is seen there that the signal ADR-AX will go low when a predetermined condition exists on lines 4, 5, 6 of the ABUS in the AMS. The condition is that the address AX, where X is don't care, must be on the ABUS. In a similar manner, tracing of the signal ABUS-3 to FIG. 12 of the AMS application shows that it will be high when the input signal AD-3 to bus driver 24 there is high. This signal will be high when the microprocessor writes to any of addresses A0–A4 (hex). Likewise, pins 5 and 4 of decoder 16 in FIG. 3 will be low when any of these addresses appear on the ABUS. With pin 6 high and pins 4 and 5 low, decoder 16 is enabled, and the address on the ABUS will enable one of bus drivers 11–15 in FIG. 3. In this fashion, the automated maintenance system selectively stores the desired bit pattern on the DCL bus eight bits at a time.

Once the correct bit pattern has been latched on the DCL bus to select an internal pathway in the CPU, a single line enable signal must be generated which will cause the CPU to switch the selected pathway into communication with the ZMPD bus. Once the proper pathway is coupled to the ZMPD bus, the automated maintenance system may read the contents of an internal register or the memory location addressed by the MPA bus. These enable signals are necessary because a single bit pattern on the DCL bus may access more than one internal register in the internal units. The precise register or memory location desired will be determined by which of the enable signals is activated by the AMS. For example, a given DCL pattern could access both an A register in the decimal unit and a B register in the control unit, but only the decimal unit register is desired. In such a case, the signal DU-DISP-ENA in FIG. 4 would be activated.

Path enabling registers 17 and 18 in FIG. 4 serve to convert information presented via the SBUS by the automated maintenance system into the single line enable signals seen as the outputs of these registers. For example, should the automated maintenance system desire display of a register in the control unit, bit two of the SBUS would be set "on" and hex address A5 would be written on the automated maintenance system address bus. As in the case of the bus drivers 11–15 in FIG. 3, when the address A5 appears on the address bus, the signal WR-IO-A5 from decoder 16 causes path enable register 17 to store the data on lines 0–7 of the SBUS. The above events will cause the signal CU-DISP-ENA to be activated. This signal causes the CPU to interpret the bit pattern on the DCL bus in FIG. 3 as the designation of the particular register in the control unit which is to be examined. The CPU then couples that particular register to the ZMPD bus and strobes its data into data register 16 in FIG. 1. As seen in FIG. 4, there is a separate enable signal for port display (DISP-ENA), decimal unit display, control unit display, virtual unit display, display of cache contents, memory locations in the main store, and an enable signal to allow the automated maintenance system to write to a location in the main store (WRITE). There are also separate enable signals for the upper and lower halves of the cache store, and two signals for controlling timing margins in the control unit and memory, i.e., INH-CU-OVLP and INH-MEM-OVLP.

In order to properly test a central processing unit, certain of its operating conditions must be controlled by the automated maintenance system. The operating condition control register 19 in FIG. 1 performs this function. The circuitry that comprises this control register is shown in more detail in FIGS. 2, 5 and 7.

Many different operating conditions need to be controlled for a complete debug capability. For example, very often in central processor debug operations it is advantageous to have the ability to run the logic circuitry in both fast and slow modes. Sometimes a problem in the fast mode is caused by a slow chip such that the problem disappears when the logic circuitry is run at a slower clock rate. The version of the central processing unit for which this interface circuit was designed has the ability to run each of its internal units in both fast and slow modes. Registers 20 and 22 in FIG. 5 serve to convert information on the SBUS to control signals which dictate which mode each internal unit of the processor is operating in. For example, when the test engineer desires that the virtual unit run in the slow mode, a command will be entered causing the AMS to activate bit 1 of the SBUS such that the output signal VU-SLOW from register 20 is placed in the logical state to cause the virtual unit to enter the slow mode. Register 20 is enabled by the signal WR-IO-AB, and will store the data on the SBUS in its registers when this signal goes low upon appearance of the address AB (hex) on the address bus. Registers 20, 21, 23 and 24 in the preferred embodiment are 74LS373 Octal D Latches. Decoders 30 and 31 in FIGS. 6 and 7 perform the same function as decoder 16 in FIG. 4 in decoding the address appearing on the ABUS and selectively enabling registers 20–25. They are the same type chip as decoder 16.

Register 21 serves to convert the information on the SBUS to one of five output signals used for the following purposes in controlling the CPU. The signal FINIT-CTL is used to initiate all control flip flops in the CPU. Similarly, the signal FINIT-CLR is used to clear all registers and control flags in the CPU. The signals EXECUTE and DEXE-SW combine to control whether the CPU executes the execute fault vector or whether it is to execute an instruction the op code of which is stored in the data registers 16 in FIG. 1. The fault vector is an address to which the CPU goes when a particular fault condition occurs. This fault condition address represents the beginning of a routine to take whatever corrective action is necessary to cure the fault encountered by the CPU. Typical stop on fault conditions are an overflow condition in an arithmetic operation or master mode entry fault where some problem occurs in a transfer between an application program and the operating system.

Figure 7:
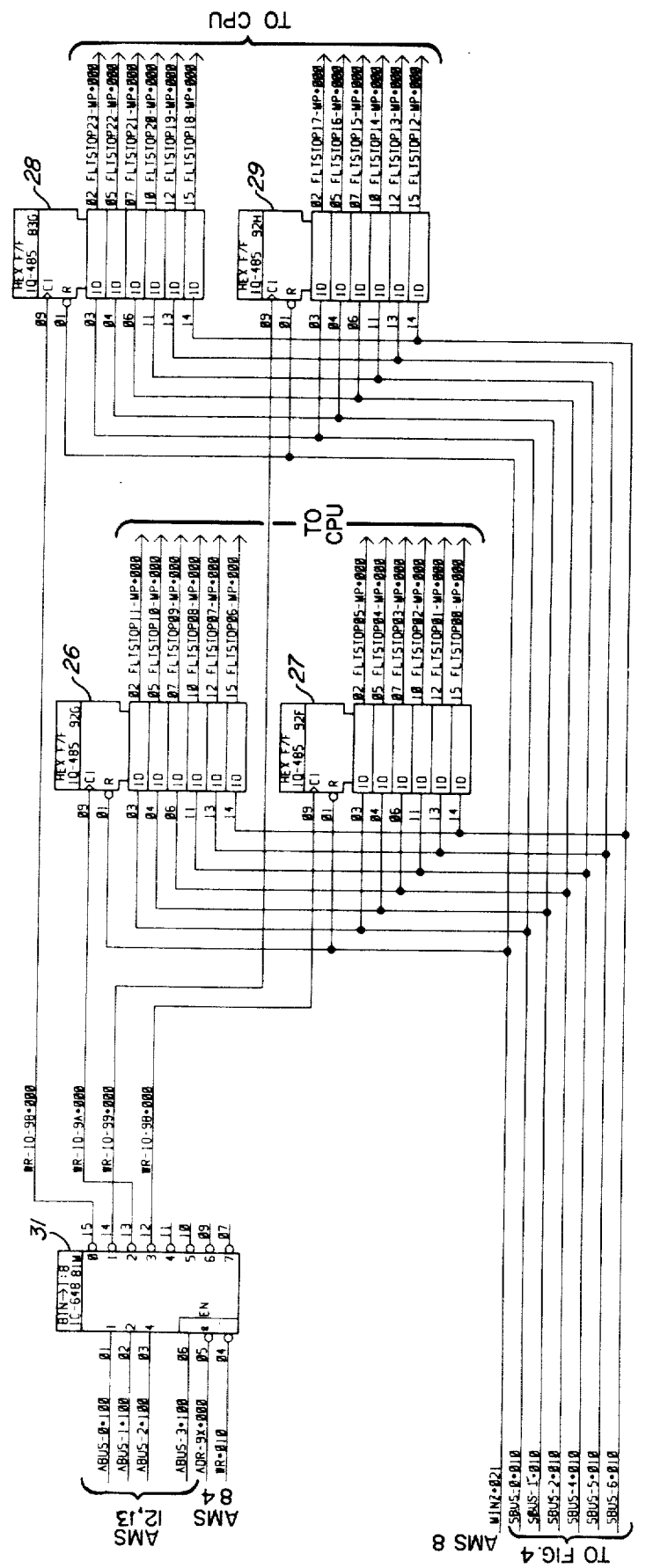
Figure 10A:
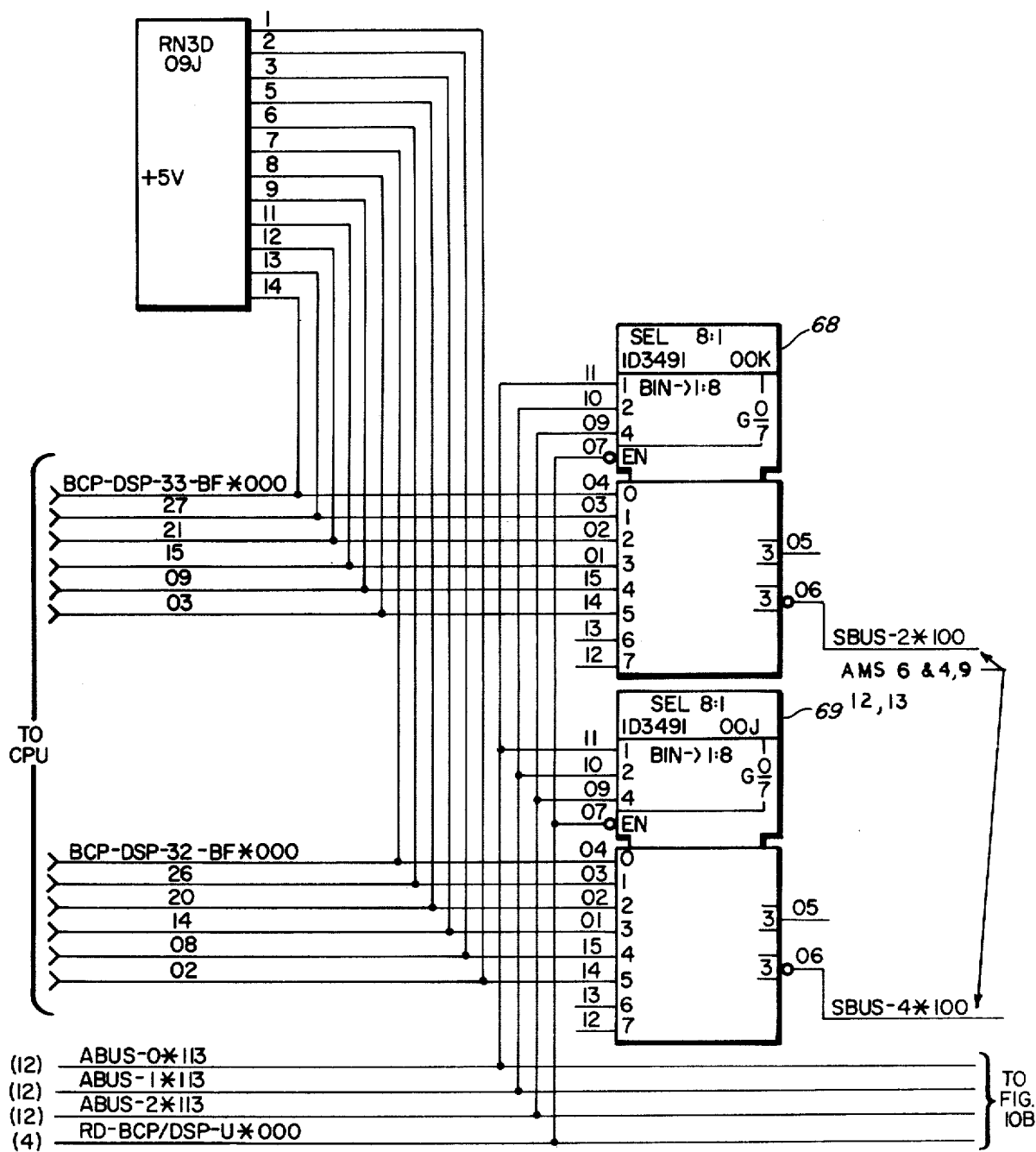
FIGS. 10A, 10B, 11 and 12 are a logic diagram for the D.U. control point register 76 in FIG. 1.
Figure 10B:
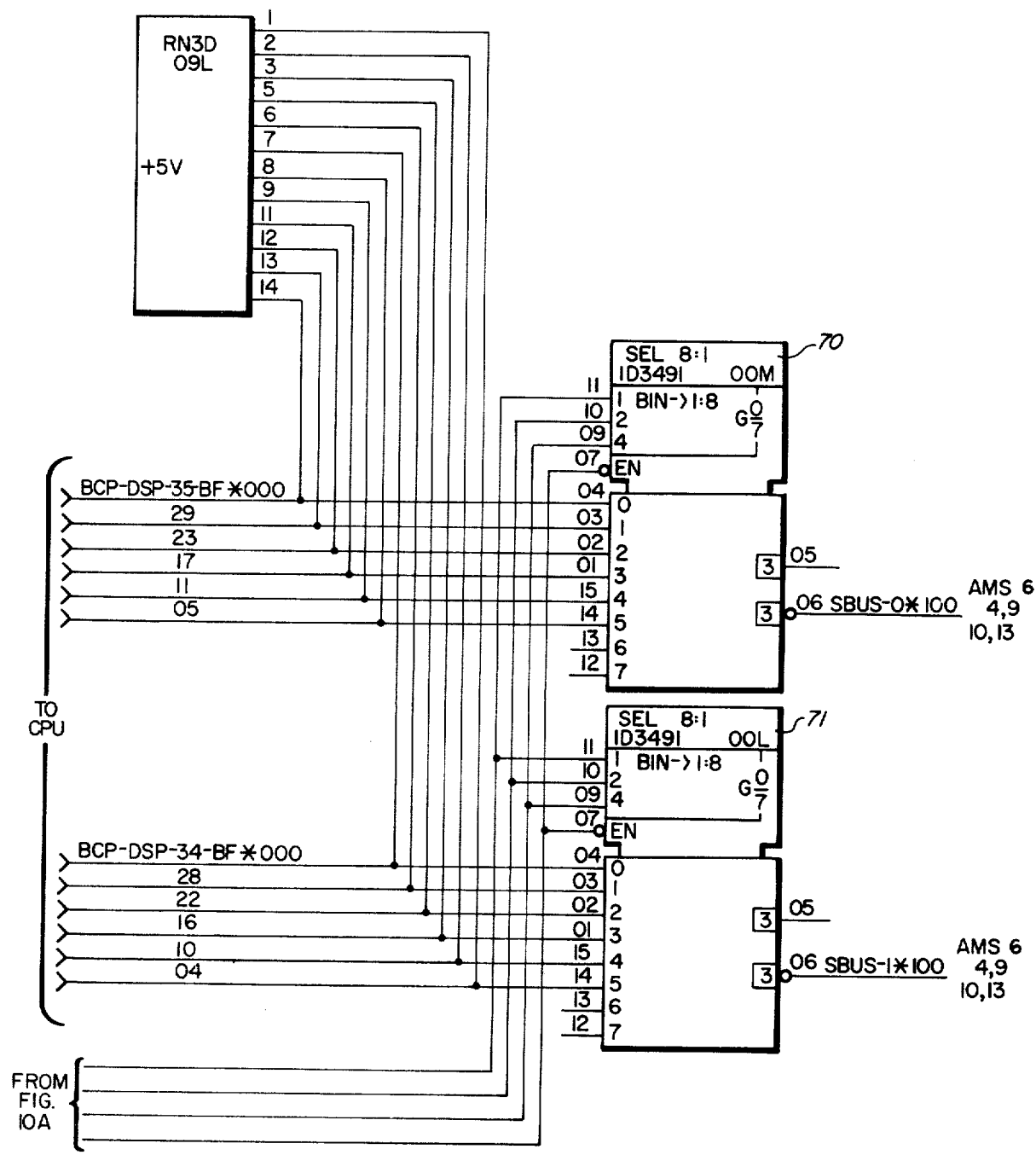

The stop on fault conditions are set by the automated maintenance system via registers 26–29 in FIG. 7 where each signal line FLTSTOP 00–23 represents a particular fault condition which could occur. The automated maintenance system controls which, if any, of the particular stop on fault conditions is set via lines 0–6 of the SBUS and decoder 31.

The signal DSCOPE-RPT from register 21 in FIG. 5 tells the CPU to repeat the instruction stored in data register 16 in FIG. 1. When the signal is activated, the CPU will continually execute the single instruction represented by these data switches at the beginning of a scope sweep so that the testing engineer can examine critical points in the logic with an oscilloscope.

The output signals from register 23 in FIG. 5 set selected stop on address conditions in the CPU. For example, the signal SOA-WS will cause the CPU to stop processing when a particular address in the working space of the virtual memory is accessed. Likewise, the signal SOA-VA & WS and SOA-VA-SEGID cause the CPU to stop when a particular virtual address in the working store or a virtual address constituting a segment ID descriptor in a disc storage backup unit are accessed by the CPU.

The output signals of register 25 in FIG. 5 signal the CPU to stop upon certain other conditions. For example, the signal SOA-OPND indicates a stop is desired when the address of a certain operand appears. The signal SOA-INSTR signals a stop when a certain instruction address appears. The signal SOA-ALL causes the CPU to stop any time a particular address is accessed.

The output signals from register 24 in FIG. 5 serve to place various internal units of the CPU in the step mode of operation. For example, the signal VU-STEP causes the virtual unit to execute only one instruction and then stop. The signal STEP from pin 16 of register 24 is transferred to FIG. 2 and serves to clock pulse generator 44 to cause a strobe pulse $STEP.1 to be generated and sent to the CPU causing the step to occur. FIG. 5 shows that the signal STEP is controlled by bit 6 of the SBUS thereby vesting full control of the step strobe in the automated maintenance system.

Some of the circuitry comprising the operation condition and control register 19 is shown in detail in FIG. 2. Part of the circuitry in FIG. 2 is used to generate strobe signals for use in reading and writing memory locations and reading the contents of the cache. This circuitry also generates the strobe pulse used by the CPU in the step mode and gates the output of the pulse generator between the memory strobe and step strobe outputs to the CPU. Pulse generator 44, in the preferred embodiment, is a 74LS112 J-K flip flop (The TTL Data Book for Design Engineers loc. cit.) and works as follows. When the automated maintenance system sets the step bit in register 24 of FIG. 5, the signal STEP is applied to the clock input of pulse generator 44. This event enables the J and K inputs on pins 11 and 12 respectively. The data on these J and K inputs will be transferred to the outputs on pins 5 and 6 respectively upon the high to low transition of the signal STEP. The J and K inputs and the reset input at pin 14 are coupled to the signal PULL-UP as are the inputs G1 and G2 at pins 3 and 4 of monostable 45. The signal PULL-UP is always high, and therefore pulse generator 44 is operating in the toggle state. Thus the signals at output pins 5 and 6 toggle at every high to low transition of the signal STEP. Delay line 46 causes the signal from the Q output to be fed back after a short delay to the reset input at pin 10. This causes the output pulse at pin 6 to have a duration equal to the amount of delay imposed by delay line 46. The signal from pin 6 is applied to gates 47 and 48.

Gates 47 and 48 serve as the output gates for the memory strobe ($AR-MP) and the step strobe ($STEP) signals. In the preferred embodiment, these gates are 74LS10 NAND gates. (The TTL Data Book for Design Engineers, loc. cit.) The purpose of these gates is to prevent the strobe pulse from the pulse generator from reaching the CPU under certain circumstances involving the step and display states of the CPU. The CPU has a step state and a display state controlled by a display enable flip flop in the CPU. The state of this flip flop is controlled by the signal DISP-ENA from register 17 in FIG. 4 which signal is under the control of the automated maintenance system. Gates 47 and 48 in FIG. 2 prevent the step strobe output signal from gate 48 from reaching the CPU when the display enable flip flop is in the display state. That is, the signal $STEP can reach the CPU only when the CPU or a unit therein is in the step mode. Gate 47 has two additional inputs beside the strobe input from pin 6 of the pulse generator 44. These inputs are the signal CACHE/STORE and the signal AR-BUSY-CC. These two signals act as prerequisite conditions for transmission of $STEP.1 strobe signal to the CPU as the $AR-MP memory strobe signal. The signal CACHE/STORE is the output of inverted OR gate 49 which has the signals CACHE-DISP and STORE-DISP as inputs. These two signals come from FIG. 4. As noted in discussing FIG. 4, these two signals serve to enable display by the automated maintenance system of designated locations in the cache or the main memory. Thus, when either of these two signals is active, the signal CACHE/STORE indicates that the automated maintenance system is working with memory and the pulse from pulse generator 44 should be steered through gate 47 instead of gate 48 to act as memory strobe signal $AR-MP. The one other condition to gating the pulse through gate 47 is that the CPU signal that it is ready to access another memory location. This is the purpose of the AR-BUSY signal from the CPU. This signal indicates that the address register in the CPU is not busy, and the CPU is ready to make another memory access. When these two conditions are met, the memory strobe signal is gated to the CPU thereby causing a read or write operation to a memory location or a read of a cache location selected by the automated maintenance system.

Likewise, there are two conditions to gating the strobe pulse from pulse generator 44 through gate 48. Those conditions are that the automated maintenance system is not accessing cache or the main memory, as indicated by the signal CACHE/STORE 010 from inverter 50. The other condition is that the CPU must signal that it has stopped processing under its own control and that it is ready for control to be given to the automated maintenance system. This state of affairs is indicated by the signal STEP/DIS which is the output from inverted OR gate 51. The inputs to this gate are signals from the CPU indicating its internal status. For example, when the CPU has stopped its normal processing and the virtual unit has been placed in the step mode, the CPU will signal these facts by sending the signal FVUSTEP-VL to an input of gate 51.

The input signals to gate 51 do more than just signal that the CPU has stopped and a particular unit has been placed in the step mode. Essentially, they serve as stop and go signals for the automated maintenance system. That system may not have control of the CPU until one of these signals indicates regular processing therein has ceased and the AMS may have control of the internal pathways of the CPU. Such cessation of processing occurs when any stop on address or stop on fault condition is met. When stop on address condition has been met, the signal FADDRSTOP-CC will be sent to gate 51. Likewise, when a stop on fault condition has been met, the signal FSTOPONFLT-CP will be sent to gate 51. Similarly the automated maintenance system may not examine any internal register or memory location until the signal FDIS-CP has been received.

The output signal STEP/DIS 010 from gate 52 is the inverse of the output signal from gate 51 and serves to enable register 17 in FIG. 4 when the CPU is in a state where it can receive the display enable commands.

The interface circuit described herein has a wrap around test capability allowing the automated maintenance system to self test without the presence of a CPU. This wrap around is provided by the output signals DO-STEP and the signal TSB-WRAP from register 53 in FIG. 2. Bit 2 of the SBUS controls the signal do step, and bit 1 of the SBUS controls the signal TSB-WRAP. By setting bit 2 of the SBUS, the automated maintenace system can simulate a response from an imaginary CPU indicating that it is ready to receive the step strobe signal $STEP-MP. This step strobe signal serves to start the CPU in operation again after it has been stopped. By setting bit 1 of the SBUS, the automated maintenance system may simulate control point data coming back from an imaginary CPU via the TSB bus. The output signal, TSB-WRAP from register 53 goes to register 54 in FIG. 3A and serves as an enabling signal therefor. Register 54 serves as a self test register allowing a bit pattern on the SBUS simulating a control point bit pattern from an imaginary CPU to be transmitted to FIG. 13 via the signal lines TSB 00-07 in FIG. 3B. The circuitry in FIG. 13 transfers the bit pattern on the TSB lines back to the SBUS via registers 55 and 56 where the automated maintenance system can read it.

Registers 55 and 56 comprise control point register 57 in FIG. 1. These registers serve to store control point information regarding the status of various control flip flops in the internal units of the CPU so that the automated maintenance system can test the status of those units. Normally, this control point information comes in on lines TSB 00-07 comprising the TSB bus in FIG. 3.

The automated maintenance system may be reset by the CPU under test or manually via an initialize switch mounted on the circuit board for the interface circuit disclosed herein. Monostable 45 in FIG. 2 serves to generate the pulse necessary for this initialization, and this pulse is called the signal RSET-IN. The monostable is triggered by the high to low transition of either the signal FINZ-CLEAR-CP or the signal INZ-SW-NO. The former comes from the CPU on power up or when the initialize switch for the CPU is operated. The latter signal comes from the manual initialize switch mounted on the interface circuit board.

Some means must be provided to provide an address on the CPU for use in setting stop on address conditions, reading the cache and reading or writing to main store memory locations. This function is performed by the address to CPU register 58 in FIG. 1. This circuitry is shown in more detail in FIG. 6. Registers 59–64 serve to convert information on the SBUS into a 34 bit address for transfer to the CPU by the MPA bus. In the preferred embodiment, these registers are 74LS174 hex D flip flops. The six D inputs of each register are coupled to bits 0–6 of the SBUS. The Q outputs are the bits of the MPA bus. All six registers are simultaneously reset when the signal MINZ from the automated maintenance system makes a high to low transition. The information at the D inputs is transferred to the MPA bus upon the low to high transition at the clock inputs at pin 9. The respective clock inputs of registers 59–64 are connected to the outputs from decoder 65. This decoder serves to sense the address on the ABUS of the automated maintenance system and to sense when the addresses 90 through 95 (hex) appear. If any of these six addresses appears, one of the outputs from the decoder will be activated thereby transferring the information then on the SBUS to the MPA bus. The flip flops in each register will then hold the six MPA bus lines assigned to those flip flops in the logical state that was on the SBUS when that particular register was clocked. By sequentially addressing each of registers 59–64, it is possible for the automated maintenance system to construct a 34 bit address using only the six lines of the SBUS.

In the prior art maintenance panels, a long string of manually operated switches was used to enter data into the CPU and a long line of LED indicators was used to display data in binary form from the CPU. Use of these devices was difficult and slow. In the present invention, both are replaced by data register 16 in FIG. 1. FIGS. 8 and 9 show the details of the logic circuitry of this data buffer. The ZMPD bus in FIG. 1 is shown as a bidirectional bus. FIG. 8 shows that data registers 32–37 which are used to assemble data from the SBUS for transmission to the CPU. FIG. 9 shows the registers 38–43 which are used to hold data from the CPU until the automated maintenance system can read it six bits at a time via the SBUS. The registers of FIGS. 8 and 9 are used to write data into internal registers or memory locations of the CPU, to provide instruction op codes and to transmit data such as the contents of an internal register or memory location back from the CPU to the automated maintenance system for display. These registers also replace the prior art data scroll wherein a manually operated rotary switch was used to select one of a plurality of data scrolls for display on the LED indicators of the prior art panels. By operation of the rotary switch, the test engineer selected which of the internal registers of the machine he wanted to examine.

Operation of these registers is very similar to the address bus buffer 58 described above. Decoder 66 in FIG. 8 serves to selectively enable registers 32–37 by sensing the address on the ABUS of the automated maintenance system. When any of the addresses 80–85 (hex) appears, one of these registers will be enabled at their pin 11 enable inputs. A second enable input at pin 1 serves as the output control and will place the output pins connected to the ZMPD bus in a high impedance state when the pin is held high. This enable input of each of registers 32–37 is coupled to the signal RSWO-CM from the CPU. This signal indicates that the CPU is ready to receive data. In the preferred embodiment, these registers are 74LS 373, Octal D Latches.

Similarly, Decoder 67 in FIG. 9 senses the address appearing on ABUS of the automated maintenance system and selectively enables one of registers 38–43 when any of the addresses 80–85 (hex) appear and when the signal RD-010 from the automated maintenance system indicates that the automated maintenance system wishes to read data from the SBUS. In the preferred embodiment, registers 38–43 are 74LS 386 three state hex bus drivers. (The TTL Data Book for Design Engineers, loc. cit.). The purpose of registers 38–43 is to buffer data received from the CPU and hold it until the automated maintenance system may read it.

The control points in the decimal unit of the CPU are accessed through the BCP bus coupling the CPU to DU control point register 76 in FIG. 1. There are 72 individual lines comprising the BCP bus. The circuitry comprising the DU control point register 76 is shown in FIGS. 10A, 10B, 11 and 12. Selectors 68–75 in FIGS. 10A, 10B and 11 and selectors 77–80 in FIG. 12 serve to select one of six individual BCP lines connected to their inputs and to couple the selected line to the SBUS line connected to the output of each selector. In the preferred embodiment, the selectors are 74LS251 eight line to one line three state selectors. (The TTL Data Book for Design Engineers, loc. cit.). Control over which BCP line is selected is exercised by the automatic maintenance system via lines 0–2 of the ABUS. These lines are coupled to the selector input pins 9–11 of each selector. The enable input of each selector is coupled to the signal RD-BCP/DSP-U or-L coupled to the automated maintenance system. This signal indicates that the automated maintenance wishes to read the BCP bus. For example, if the automated maintenance system wishes to read bits 0–5 on the BCP bus, it will write the proper address on the ABUS to select input line 5 at pin 14 of selectors 72, 73, 68, 69, 70 and 71. It will then activate the signal RD-DCP/DSP-U connected to the enable inputs of these selectors. When these two events have occurred, the lines 0–5 of the BCP bus will be connected to lines 0, 1, 2, 4, 5 and 6 of the SBUS.

Figure 11:
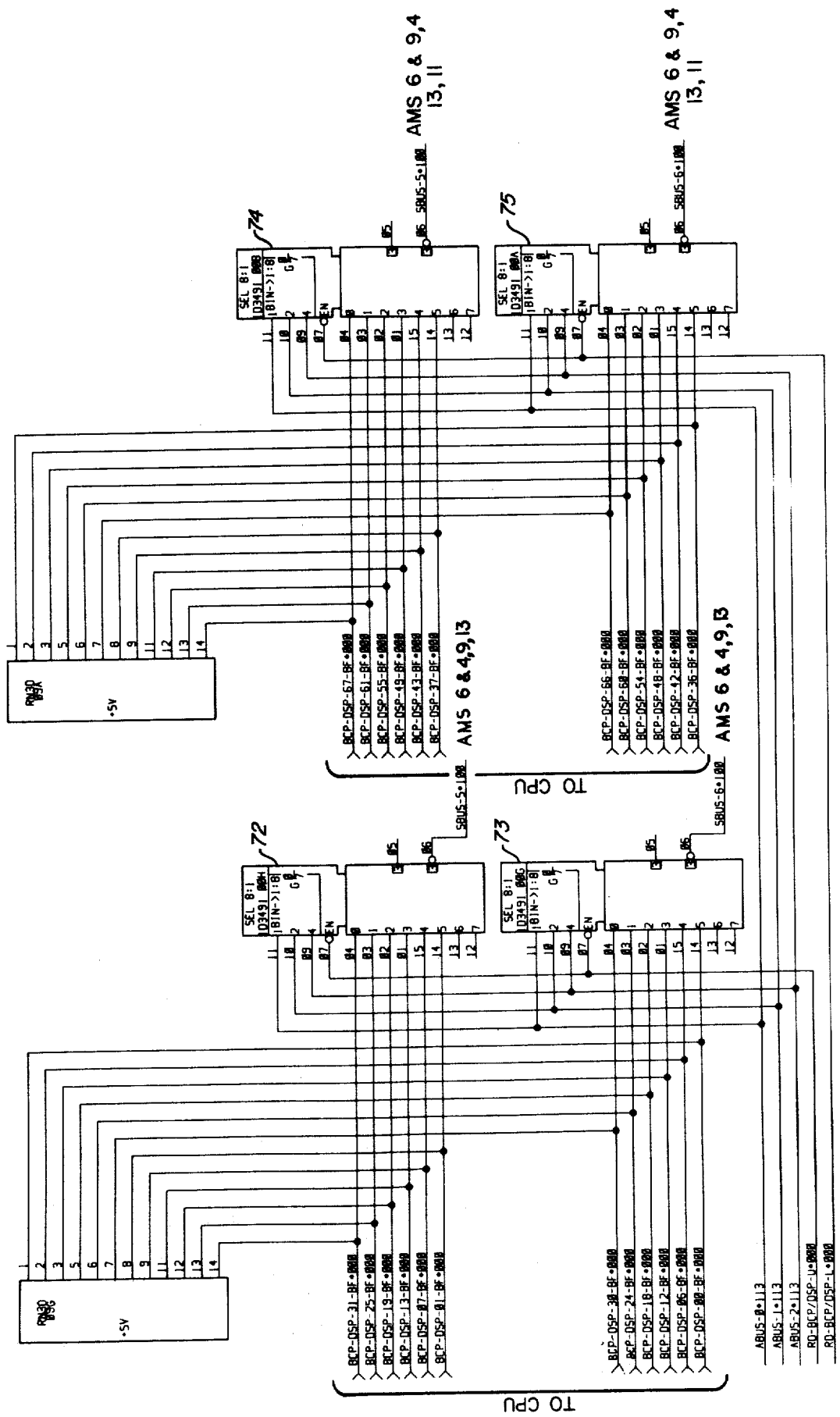
Figure 12:
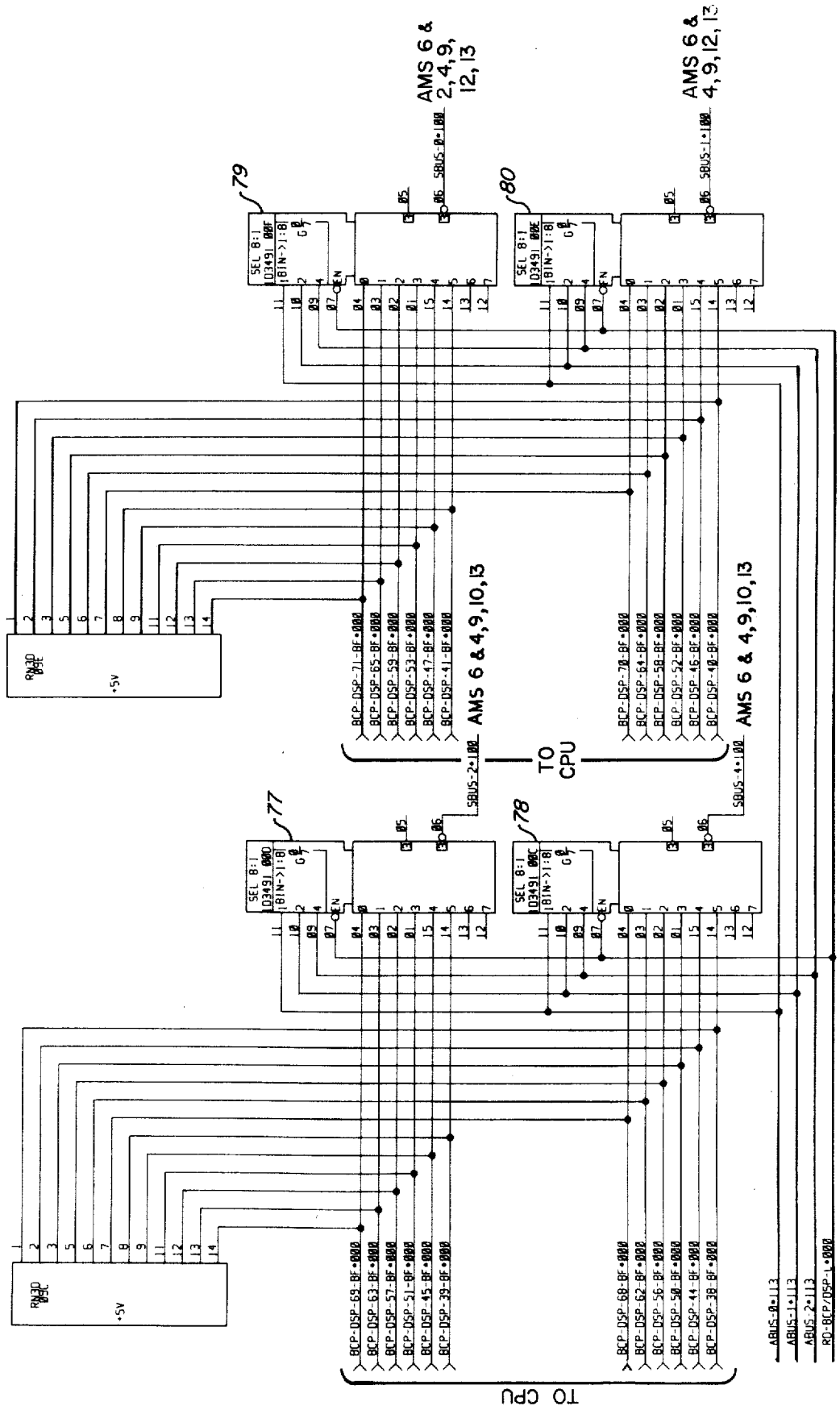
Figure 13:
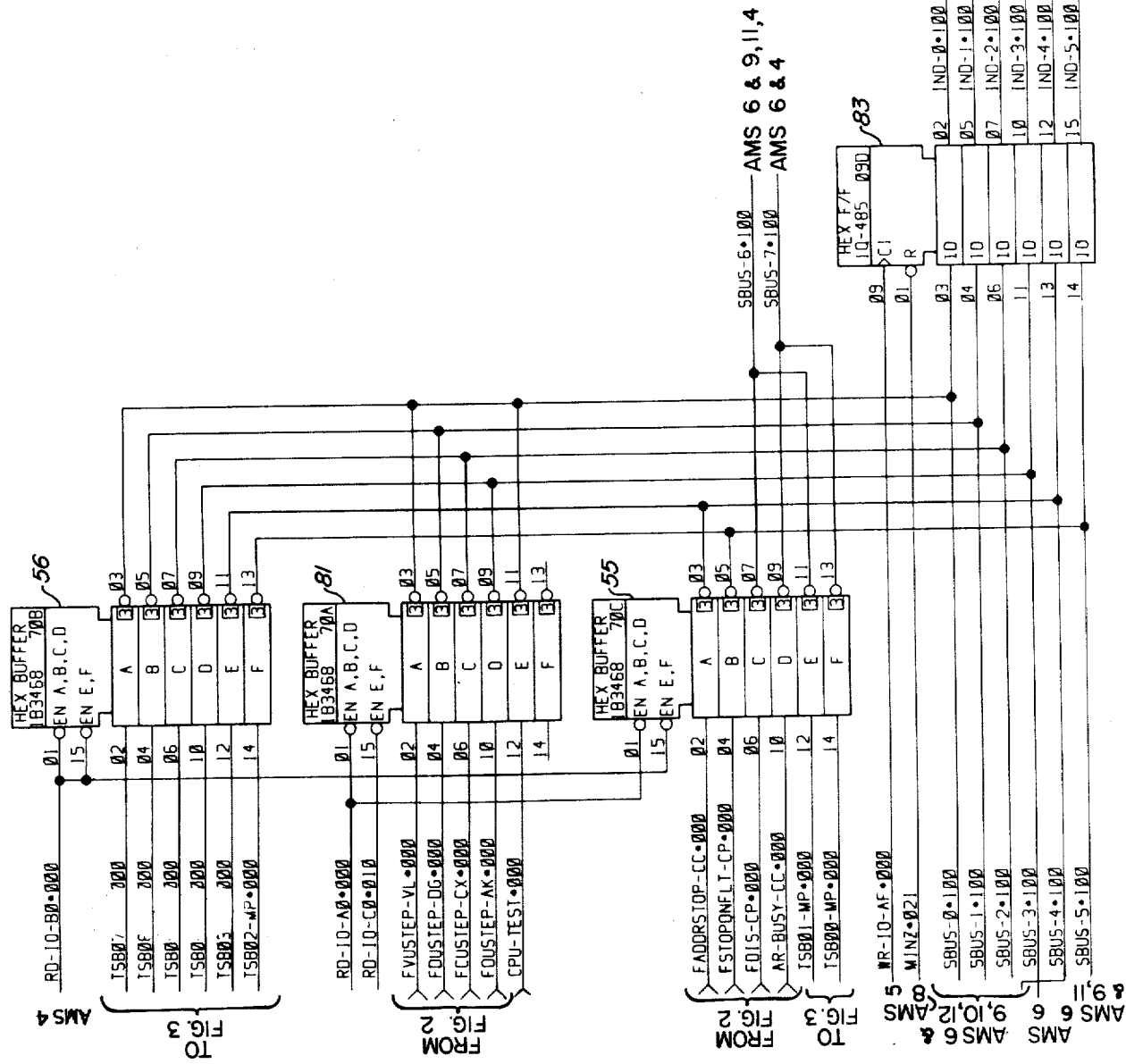
FIG. 13 is a logic diagram of the control point register 57 in FIG. 1 and part of the operating condition control register 19 in FIG. 1.

On FIGS. 11 and 12, it is noted that the enable inputs of registers 74, 75 and 77–80 are coupled to the signal RD-DCP/DSP-L. This signal also comes from the automated maintenance system, and indicates that the system wishes to read six lines of the lower 36 bits on the BCP bus. Conversely, the RD-BCP/DSP-U is used by the automated maintenance system to read six lines of the upper 36 bits of the BCP bus.

The control point register 57 in FIG. 1 is used to buffer control point data coming in from the CPU via the lines 0–7 of the TSB bus. Registers 55 and 56 in FIG. 13 comprise this control point register. These registers are used to store the control point information from internal units of the CPU other than the decimal unit.

Registers 56 and 57 are 74LS368 three-state hex bus drivers in the preferred embodiment. The inputs of register 56 are coupled to the lines 2-7 of the TSB bus via FIG. 3. Lines 0 and 1 of the TSB bus are coupled to register 55 via FIG. 3. Lines 0-7 of the SBUS are coupled to the outputs of registers 55 and 56 so that these registers can be read when the signal RD-IO-B0 from the automated maintenance system enables the registers via pins 1 and 15.

Register 81 and flip flops A-D of register 55 comprise a portion of the operating condition and control register 19 in FIG. 1. The input signals to these registers labelled "from FIG. 2" are the response signals seen at 82 in FIG. 1. As noted earlier in connection with the discussion of FIG. 2, these signals are responses from the CPU which indicate its status, and serve as stop and go signals for the automated maintenance system. Registers 81 and 55 serve to hold these response signals until they can be read by the automated maintenance system via the SBUS. The outputs of flip flops A-D of register 55 are taken out of the high Z state when the pin 1 enable input is activated. This occurs when the signal RD-IO-A0 from the automated maintenance system is lowered. The same is true for flip flops A-D of register 81. Flip flop E of register 81 is activated when the signal RD-IO-C0 from the automated maintenance system is lowered. Register 81 can be a 74LS368 tri state hex bus driver.

Register 83 serves as a buffer for signals from the automated maintenance system expanding the systems self test capability. There are certain problems in the automated maintenance system which cannot be tested by the board tester mentioned in the AMS application referenced above. The outputs of registers 84-89 are connected to individual indicator LED's which are visible to the testing engineer. These LEDs ar not shown in FIG. 13. When a certain problem is detected which the board tester cannot indicate, the automated maintenance system can indicate this fact by lighting the specific LED assigned to that particular problem. Register 83 can be a 74LS174 hex D flip flop. (The TTL Data Book for Design Engineers, loc. cit.).

Although the invention has been described in terms of the preferred embodiment disclosed herein, it will be obvious to those skilled in the art that many variations in components or arrangements are possible. Any arrangement accomplishing a similar function in a similar manner utilizing similar means is intended to be included within the scope of the claims appended hereto.

What is claimed is:

1. An interface apparatus for coupling an automated maintenance system (AMS) to the CPU of a data processing system comprising:
   a first means for converting information from said automated maintenance system into predetermined control signals, said predetermined control signals for controlling the pathways in said CPU accessed by said AMS, said predetermined control signals also for controlling the operations performed by said CPU;
   a second means for receiving control point information signals from said CPU, said control point information signals indicating the internal status thereof said second means further including means for transferring said point information signals to said automated maintenance system;
   a third means for supplying AMS supplied address information to said CPU for use by it in selected operations;
   a fourth means for transferring AMS supplied data to said CPU, said fourth means including apparatus for receiving and holding data from said CPU requested by said AMS by said supplied data; and
   a bus means coupling said AMS to said first, second, third and fourth means for supplying the proper information to each said means for performing its operations and for supplying information from said fourth means to said AMS.

2. An interface apparatus for coupling an automated maintenance system (AMS) to the CPU of a data processing system comprising:
   an SBUS coupled to said AMS for carrying data signals to and from said interface circuit for use in the operations of said interface apparatus thereof;
   a control bus coupled to said AMS for carrying control signals to said interface circuit, said control signals for controlling the operations of said interface apparatus;
   an address bus coupled to said AMS for carrying address information to said interface circuit;
   a path control and enabling means comprised of a plurality of registers coupled to said SBUS, wherein first data from said AMS via said SBUS is stored in the register designated by said address and control busses, said path control and enabling means further comprised of a DCL bus and an enabling signal bus both coupled to said CPU, a first portion of said first data transferred to said CPU via said DCL bus defining selected apparatus in said CPU to be accessed, a second portion of said first transferred data to said CPU via an enabling signals bus selecting and enabling said selected CPU apparatus to be accessed by said AMS in its operations;
   an operations condition control register means comprised of a plurality of registers for transferring second data from said AMS via said SBUS to the register designated by said address and control busses, wherein this data is transferred to said CPU in the form of control signals that initialize the operation of said CPU, said operations condition control register receiving response signals from said CPU verifying that the desired operations have been initialized;
   a control point register means comprised of a plurality of registers for receiving control point information from said CPU indicating the status of control signals generated in said CPU and for holding this data until said AMS reads it via the SBUS;
   an address register means comprised of a plurality of registers for receiving address information from said AMS via the SBUS in the order specified by said address and control busses, said address register means further transferring said address information to said CPU via an MPA bus for controlling certain AMS selected operations in said CPU; and
   a data register means comprising a plurality of registers for receiving data stored in the register selected by said address and control busses from said AMS via said SBUS and for transferring said stored data to said CPU for causing certain AMS selected events to occur in said CPU, and for receiving data from said CPU for transfer to and display by said AMS, said data indicative of certain conditions in said CPU.

* * * * *